Sept. 18, 1934. F. D. HOFFMAN Re. 19,317

FUEL CONDITIONING APPARATUS

Original Filed Oct. 25, 1928 2 Sheets-Sheet 1

INVENTOR.
Fred D. Hoffman.
BY Albert G. Davis
ATTORNEY

Sept. 18, 1934. F. D. HOFFMAN Re. 19,317

FUEL CONDITIONING APPARATUS

Original Filed Oct. 25, 1928 2 Sheets-Sheet 2

INVENTOR.
Fred D. Hoffman.
BY
ATTORNEY

Reissued Sept. 18, 1934

Re. 19,317

UNITED STATES PATENT OFFICE 19,317

FUEL CONDITIONING APPARATUS

Fred D. Hoffman, Cleveland, Ohio, assignor, by mesne assignments, to Richard F. Kehr Original No. 1,831,912 dated November 17, 1931, Serial No. 314,997, October 25, 1928. Application for reissue September 23, 1933, Serial No. 690,747

13 Claims. (Cl. 110—75)

My invention relates to furnaces and more particularly to fuel conditioning apparatus therefor, the principal objects of the invention being to effect substantially complete combustion of fuels such as petroleum coke, hard or soft coal and tar, so as to obtain a maximum number of heat units therefrom, to effect efficient application of the resultant heat.

A correlative object is to prevent the formation of soot and escape of unburned combustible gases by aerating and burning the combustible products while in the furnace fire bowl.

A more specific object is to direct a stream of preheated air onto the upper surface of the fuel bed in a manner such as to maintain the resultant burning mixture of gases evolved from the fuel and preheated air in close heating proximity with the walls of the combustion chamber so as to utilize most effectively the resultant heat.

Another object is to provide a Venturi grate which is adapted to receive air from outside of the furnace combustion chamber, conduct such air in heating proximity to the fire bed so as to preheat the same while maintaining it out of contact with the fuel bed, to freely expand the air thus preheated so as to maintain the flow through the Venturi grate while at the same time reducing the velocity prior to discharge therefrom, and to discharge it as a more slowly moving forcible preheated stream uniformly onto the upper surface of the fuel bed for effecting uniform surface combustion of the fuel and for eliminating localized air currents and consequent excessive rates of combustion of localized portions of the fuel bed.

Another object is to accomplish these results by means of a Venturi grate which may be manufactured economically and installed conveniently in the combustion chamber of the usual types of furnaces without requiring any substantial change in the furnace structures.

In accomplishing these and other objects I have provided improved details of structure, the preferred forms of which are illustrated in the accompanying drawings, wherein.

Figure 1:
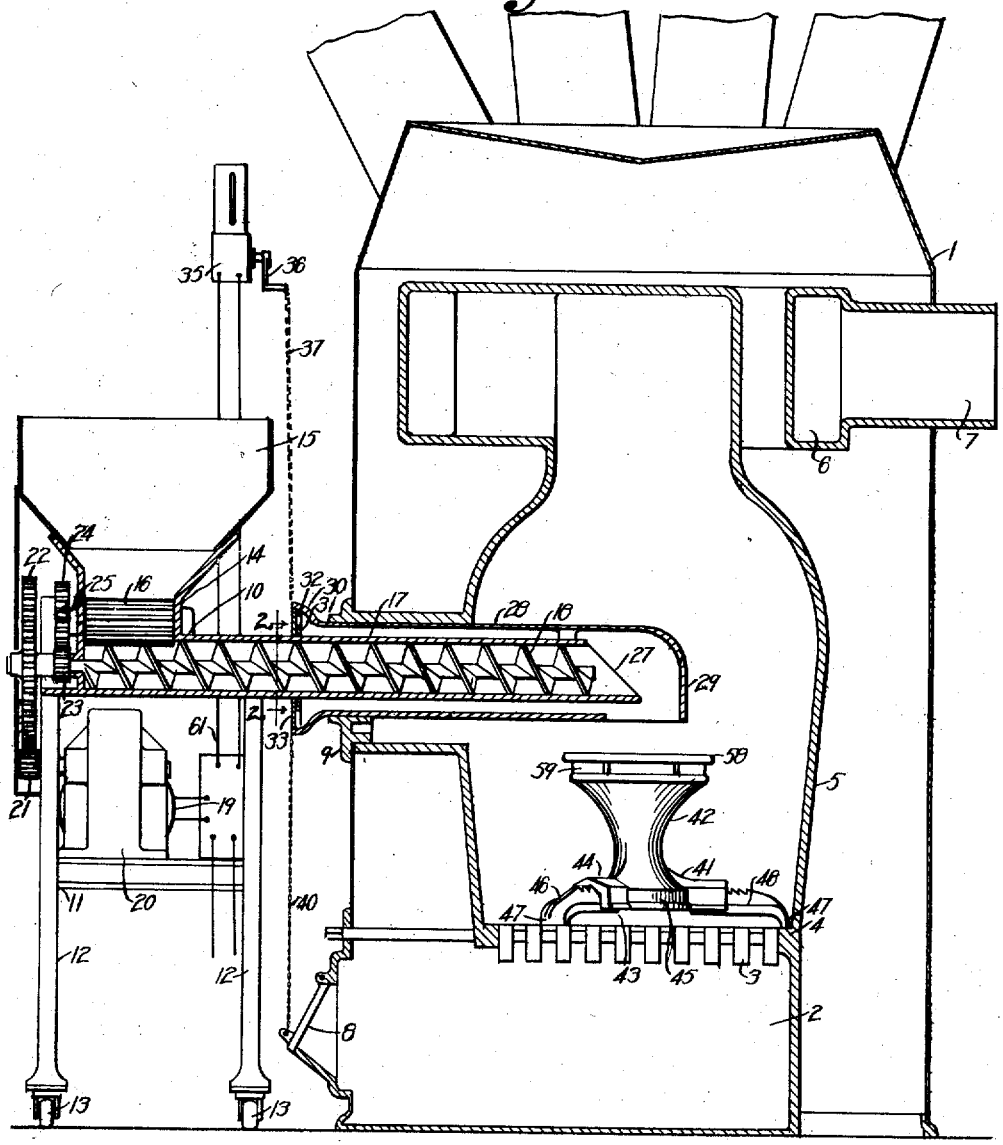
Fig. 1 is a vertical sectional view through a furnace and stoker combination equipped with fuel conditioning apparatus constructed according to my invention.
Figure 2:
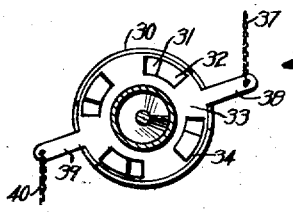
Fig. 2 is a sectional view through the stoker conduit taken on a plane indicated by the line 2—2, of Fig. 1, illustrating the down draft air inlet.
Figure 3:
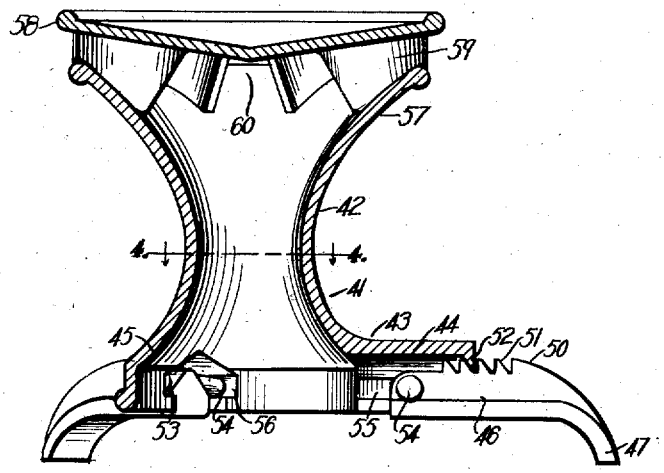
Fig. 3 is a sectional view through a preferred form of the Venturi grate preheating device utilized for discharging combustion supporting air into the furnace.
Figure 4:
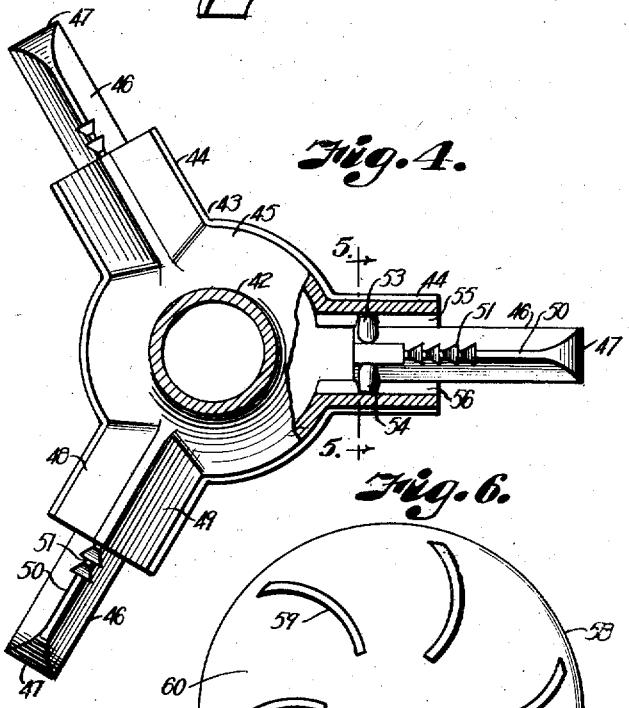
Fig. 4 is a horizontal section through the grate taken on a plane indicated by the line 4—4, Fig. 3.
Figure 5:
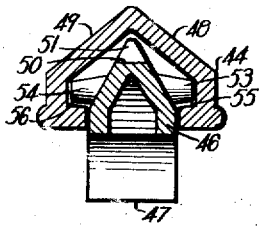
Fig. 5 is a detail sectional view through the Venturi grate, taken on a plane indicated by the line 5—5, Fig. 4.
Figure 6:
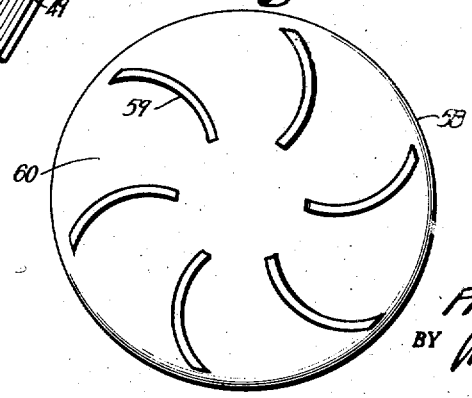
Fig. 6 is a bottom plan view of the tuyère plate of the Venturi grate.

Referring in detail to the drawings:

The invention is shown, for purposes of illustration, in connection with a furnace 1, which may be of any type but is here illustrated as an ordinary warm air heating furnace including an ash pit 2, grates 3 mounted in a ledge 4 above the ash pit, and a fire bowl 5 encircling the grate and provided at its upper end with the usual radiator head 6 for passage of products of combustion to the outlet flue 7 opening to a chimney (not shown). The ash pit 2 is provided with the usual door 8 for admitting air into the ash pit and through the grates 3 for supporting combustion of the fuel, as in ordinary practice.

Positioned in alignment with the fuel door 9 of the furnace is a portable stoker and fuel conditioning apparatus 10 including a frame 11 having legs 12 provided with rollers 13, and supported on the frame is fuel grinding apparatus 14 for pulverizing the fuel before it is fed into the furnace.

The grinding apparatus includes a fuel receiving hopper 15, and rotatably mounted in the bottom thereof are fuel crushing rolls 16 for grinding lump fuel contained in the hopper. Rotatably mounted below the rolls in a conduit 17 extending through the furnace door is a spiral conveyor 18 for feeding fuel pulverized by the rolls into the furnace. The conveyor is driven from a motor 19 carried by the frame, the motor being connected therewith through a gear reduction unit 20 which carries a drive pinion 21 meshing with a gear 22 fixed on the conveyor shaft and which meshes with gears 24 fixed on the roller shafts 25.

The conveyor conduit extends to substantially the center of the furnace and is provided with a diagonally cut end 27, through which the fuel is discharged into the fire bowl.

In order to provide a down draft over the burning fuel and about the fresh fuel discharged from the conduit, I provide the conveyor conduit with an outer coaxially mounted conduit 28 spaced therefrom and extending from a point adjacent the outer side of the fuel door to the center of the furnace and provided on its inner end with a downwardly directed outlet 29 for directing air which is admitted about the conveyor conduit downwardly over the fuel on the grate.

In order to control the passage of air through the conduit 28 I provide a bell shaped head 30 on the conduit 28 having an end wall 31 encircling the conveyor conduit and provided with a plurality of openings 32; and to control the effective port area of the openings I provide a ring shaped damper plate 33 having complementary spaced openings 34 so that when the openings in the damper and the conduit are in registration maximum air inlet is provided but when the damper is rotated to move the openings out of registration, the amount of air may be reduced or entirely cut off.

I prefer to control the damper 33 in conjunction with the damper 8 so that when one is open, the other is closed and vice versa, by thermostatic regulation as now described.

A thermostat controlled motor designated 35 is mounted on a wall of the room to be heated and the motor is provided with an actuating arm 36 connected by a chain 37 with an arm 38 projecting radially from the damper 33. Projecting from the damper diametrically opposite to the arm 38 is an arm 39 connected by a chain 40 with the damper door in the ash pit. Thus when the thermostat raises the arm 38, the damper is rotated to bring the port openings into registration to admit air through the conduit for draft over the fuel, and at the same time the damper 8 is moved to closing position, shutting off draft through the grates.

In order to control the air passing through the grates and preheat the air, and also to permit free passage of a portion of air through the burning fuel, I provide an air preheating and discharge device, comprising a Venturi shaped casting supported in upright position concentrically of the furnace over the grates 3. This casting, which forms a Venturi grate, comprises an upright hollow shell, gradually contracted from its upper and lower portions toward an intermediate portion, preferably about midway of the length of the shell, thus defining a heating chamber 41 which is gradually contracted upwardly into a short throat 42 and thence expanded upwardly forming a contiguous communicating expansion chamber 57, the purposes of which will later be described. The shell is supported over the grates by means of an adjustable spider 43. This spider may comprise hollow radial supports 44 cast integral with the lower portion 45 of the preheating compartment. Slidably mounted in the supports 44 are legs 46, each having a downwardly projecting terminus 47 providing a foot portion for resting on the flange 4 of the firebox. The supports are hollow and open on the lower face so as to receive the legs radially therein and are preferably provided with oppositely inclined upper walls 48 and 49 so that fuel will not lodge thereon but will slide off onto the grate. The legs 46 likewise have oppositely inclined upper walls thus defining the ridge 50 along the upper face thereof. This ridge is notched as indicated at 51 and on the inner wall portion of each radial support is an inwardly extending tooth 52 for engaging in the notches of the legs so that when the legs are moved to different positions inwardly and outwardly of the support they will be latched to the support member and held in the adjusted position.

The legs 46 are further provided adjacent their inner ends with laterally projecting pins 53 and 54 which engage grooves 55 and 56 in the inner sides of the supporting members so that when the Venturi member is resting on the flange, the pins bear on the lower faces of the grooves and the notched portions of the arms bear against the teeth 52 so that the legs are locked in engagement therewith due to the weight of the Venturi grate.

Since the supporting members 44 are hollow and open at their lower face and communicate at their inner ends with the heating compartment 41 they form in effect a part of this compartment and thus increase its capacity especially when the legs are drawn to their outermost position for supporting the venturi in a large fire box.

The expansion chamber of the Venturi member is provided at its upper end with a tuyère plate, spaced axially above the upper end of the expansion chamber so as to define with the upper periphery of the expansion chamber an annular discharge passage. This plate may be supported in the spaced relation by means of a plurality of curved baffles 59 cast integrally with the plate and bearing on the upper marginal portion of the inner wall surface the expansion chamber, thus dividing the annular discharge passage into a plurality of outlets 60 between adjacent baffles.

The operation of the venturi is substantially as follows: Assuming the usual fire bed is provided in the fire bowl around the outside of the Venturi grate, the passage of air through the grates 3 and directly to the under surface of the fuel bed is reduced due to the more easy access and passage through the Venturi grate, but there is a sufficient infiltration of air into the fire bowl around the outside of the venturi to maintain the lower strata of the fuel bed in a state of combustion. Most of the air however passing into the ash pit 2 discharges through the grates 3 into the interior of the upwardly contracted heating chamber 41 of the Venturi grate. Since the Venturi grate is completely surrounded by burning fuel, this air is preheated to a high temperature, upon its upward passage through the preheating compartment by the radiant heat from the inner wall surface of such compartment and by the passage through the interior of the supports 44 and legs 46. The air passing upwardly through the heating compartment 41 being thus preheated to a very high degree of temperature when it has reached the upper limit of said compartment, tends to expand and would normally build up a back pressure which would impede the flow of air through the compartment 41 and through the remainder of the grate with the probable result of overheating the entire grate. Since the expansion chamber 42 is flared outwardly or expanded gradually upwardly in the direction of movement of the air it provides for free expansion of the preheated air. As a result not only is the back pressure which would otherwise occur in the chamber 41 substantially eliminated but the flow of air upwardly out through the top of the grate is enhanced. In this manner a continuous large volume of air is caused to pass by the natural draft of the furnace upwardly through the grate along the inner wall surfaces thereof, removing the heat therefrom and causing a relative cooling of such walls so as to maintain them below a temperature which would deleteriously affect them. Also, localized intense flows of air through the fuel bed from the under side and over the fuel bed are eliminated. If, during initial expansion, the entire quantity of air were discharged directly into the fuel bed, localized currents would develop causing excessive rates of combustion at localized portions of the bed with resultant overheating and fusing of the grates and furnace structure adjacent thereto and also fusion and clinkering of fuel on the grate surfaces. Consequently, the expansion chamber is sufficiently long to allow for the initial rapid expansion so that when the air is discharged into the fuel bed it will pass thereinto as a large more uniform, more slowly moving stream free from localized currents.

As the air passes into the upper end of the expansion chamber it is impinged upon the deflector of tuyère plate 58 and also on the baffles 59 and is thereby deflected outwardly and discharged outwardly over the fuel bed with a rotary or swirling motion. This air being preheated and swirling, readily mixes with the evolved gases within the fire bowl, assuring substantially complete aeration and resultant combustion thereof before discharge from the fire bowl as well as preventing intense localized flow of air directly through the fuel bed. Thus the gases are regurgitated and burned, the swirling motion of the air carrying them through a much longer path of travel before they leave the fire bowl. Since the air is discharged radially outwardly substantially all the evolved gases must pass through the air curtain thus formed so that complete aeration of the gases is effected.

The air rising at comparatively high velocity through the expansion chamber 57 impinges on the interior of the tuyère plate 58 at a comparatively abrupt angle which tends to break the direct flow to some extent. However, since the air is being expanded freely in the lower portion of the chamber 57 below the point of discharge and since the throat 42 is comparatively short and so shaped as to cause a gradual convergence and divergence of the walls of the shell at that portion, the retardation in velocity of flow of the air out of the passages 60 does not appreciably retard the flow through the lower portion of the expansion chamber 57 nor through the short throat 42 and preheating compartment 41. Thus, by making the grate in venturi shape, a large amount of air can be passed therethrough and the usual retardation due to expansion such as is in straight tubes or other shapes of grates is not present to any appreciable extent. It is therefore possible to pass a large amount of air through the grate for cooling the same and to obtain the rapid and constant flow into the fire bowl. Since the grate is venturi shaped, there are practically no frictional losses or losses in head of the fluid and therefore the entire effective differential in head between the outside air and the stack is utilized, this even being assisted by virtue of the free expansion and consequent free rise of the air through the venturi.

I have found it desirable to control operation of the stoker conveyor feed according to the room temperature by providing the thermostat 35 with a switch for controlling current to the motor so that when the temperature in the room has reached a desired degree, the thermostat will shut off the motor through an electric circuit 61 to stop feed of the conveyor.

In operating mechanism constructed and assembled as described, the stoking apparatus may be wheeled to the fuel room and the hopper filled with fuel, or the fuel may be placed in the hopper while the stoking apparatus is in functional relation with the furnace.

The motor may then be started to crush the fuel and feed it into the furnace onto and around the air preheater. The fuel is then ignited, and the draft through the grate being open, air passes upwardly therethrough to support combustion of the fuel. Part of the air enters the lower bell of the preheater, and passes upwardly through the venturi and out through the outlets 60, as above described, to commingle with the gaseous products of combustion and promote their combustion, so that said gaseous products will be substantially completely burned before passing out of the furnace.

After the room has become sufficiently warmed, the draft door 8 is automatically lowered and the damper 33 for the down draft is opened by the thermostat to maintain a steady slow burning fire.

I have found that the above described apparatus aids in the complete combustion of the fuel to provide for economic operation, as well as for the elimination of smoke that otherwise would pass out of the chimney.

Having thus described my invention,

I claim:

1. In combination with a furnace including a fire bowl and a fuel feed door, stoking means including a horizontal conduit extending through the door substantially to the center of the fire bowl, means for admitting air upwardly through a fuel bed in the fire bowl to be discharged concentrically with the fuel discharged from the horizontal conduit, and means including an air supply conduit surrounding the first named conduit and having a downwardly directed outlet surrounding the discharge of the fuel conduit for delivering a downdraft around the fuel moving downwardly from the fuel conduit.

2. In combination with a furnace including an ash pit provided with a damper, and stoker mechanism including a fuel conduit extending into the furnace, a conduit for conducting a down draft of air coaxial with said fuel conduit, a damper in said down draft conduit, a Venturi member below the discharge of the fuel conduit for conducting air from the ash pit to the fuel bed, and thermostatically operated means including a chain connected with said dampers for coincidently controlling the stoker mechanism and the air supplies.

3. In combination with a furnace including an ash pit provided with a damper, and stoker mechanism including a fuel conduit extending into the furnace, a second conduit for conducting a down draft of air coaxial with said fuel conduit, a damper in said down draft conduit, means extending upwardly through the fuel bed and terminating at its upper end below the discharge of the fuel conduit operable to conduct air directly from the ash pit through the fuel bed and to discharge said air above the fuel bed concentrically of the down draft, and means for controlling said dampers.

4. In a furnace having a combustion chamber and grates at the bottom of the chamber operable to support a fuel bed therein and to admit air into the fuel bed from the under side, a Venturi member comprising an elongated hollow shell body disposed in upright position in said chamber in intimate contact with said fuel bed and extending from the bottom of the fuel bed above the upper surface thereof and open at the bottom to receive air at the lower end through the grates, said shell being gradually contracted from each end toward an intermediate portion to form an elongated upwardly gradually contracted heating compartment and a communicating superimposed elongated gradually upwardly expanding expansion compartment, whereby air entering the lower end of the Venturi member is heated in the heating compartment and may expand freely in the expansion compartment as it travels upwardly, deflecting means above the upper end of said expansion compartment in closely spaced relation to the expanding portion thereof for deflecting air discharging from said expansion compartment laterally of the combustion chamber and means cooperable with said deflecting means for deflecting the air along a spiral path of travel.

5. In a furnace having a combustion chamber and grates at the bottom of the chamber operable to support a fuel bed therein and to admit air into the fuel bed from the under side, a Venturi member comprising an elongated hollow shell body disposed in upright position in said chamber in intimate contact with said fuel bed and extending from the bottom of the fuel bed to above the upper surface thereof and open at the bottom to receive air at the lower end through the grates, said shell being gradually contracted from each end toward an intermediate portion to form an elongated upwardly gradually contracted heating compartment and a communicating superimposed elongated gradually upwardly expanding expansion compartment, said expansion compartment having imperforate side walls for the full length of the expanding portion thereof, whereby air entering the lower end is heated in the heating compartment and may expand freely in the expansion chamber as it travels upwardly, air vent means at the upper end of said expansion compartment above the expanding portion thereof operable to discharge air laterally from said expansion compartment, and baffle means cooperable with said air vent means to deflect the discharging air along a spiral path of travel.

6. In a furnace having a combustion chamber and grates at the bottom of the chamber operable to support a fuel bed therein and to admit air into the fuel bed from the under side, a Venturi member comprising an elongated hollow shell body disposed in upright position in said chamber in intimate contact with said fuel bed and extending from the bottom of the fuel bed above the upper surface thereof and open at the bottom to receive air at the lower end through the grates, said shell being gradually contracted from each end toward an intermediate portion to form an elongated upwardly gradually contracted heating compartment and a communicating superimposed elongated gradually upwardly expanding expansion compartment, whereby air entering the lower end of the Venturi member is heated in the heating compartment and may expand freely in the expansion compartment as it travels upwardly, a deflecting cap, and a plurality of baffles intermediate the underface of the cap and the expansion compartment wall supporting said cap in closely spaced relation to the upper end of said expansion compartment, whereby the cap defines with the upper edge of the expansion compartment a peripheral passage for the discharge of air from said compartment, said baffles being shaped to direct the air impinged on said cap outwardly from said Venturi member and along a spiral path of travel.

7. In a furnace having a combustion chamber and grates at the bottom of the chamber operable to support a fuel bed therein and to admit air into the fuel bed from the under side, a Venturi grate comprising an elongated hollow shell body disposed in upright position in said chamber in intimate contact with said fuel bed and extending from the bottom of the fuel bed above the upper surface thereof and open at the bottom to receive air at the lower end through the grates, said shell being gradually contracted from each end toward an intermediate portion to form an elongated upwardly gradually contracted heating compartment and a communicating superimposed elongated gradually upwardly expanding expansion chamber whereby air entering the lower end is heated in the heating compartment and may expand freely in the expansion compartment as it travels upwardly, means having a baffle wall at the upper end of said expansion compartment, passages intermediate said baffle wall and the upper end of the compartment, the face of said baffle wall exposed toward the interior of said expansion compartment projecting axially toward the expansion compartment at its central portion and receding from the central portion radially of the wall from the expansion compartment, and baffles on said exposed face of said wall for deflecting the air impinged on said wall along a spiral path of travel, said baffles terminating in spaced relation to each other at their inner ends.

8. In combination with a furnace, and a stoker for discharging fuel into the furnace and having a fuel outlet therein, a Venturi member mounted below the outlet for admitting air to the furnace through the fuel bed, a tuyère plate above the Venturi member for deflecting air impinging thereon from the Venturi member outwardly from the grate, baffles at the upper end of the Venturi member for deflecting said air along a spiral path about the outlet, and a conduit surrounding the fuel outlet for supplying a downdraft in the furnace opposite to the Venturi member.

9. In combination with a furnace, a stoker for discharging fuel into the furnace, a Venturi member mounted below the fuel discharge of the stoker for admitting air to the furnace through the fuel bed, a tuyère plate above the Venturi member for deflecting air impinging thereon from the Venturi member outwardly from the grate, baffles at the upper end of the Venturi member for deflecting said air along a spiral path about the fuel discharge, means for supplying a down draft in the furnace opposite to the first named supply of air, and means for alternately controlling the said air supplies.

10. In combination with a furnace and fuel feeding means including a conduit extending into the furnace substantially to the center thereof, a Venturi member mounted below the fuel discharge of the fuel feeding conduit for admitting air to the furnace through the fuel bed, a tuyère plate above the Venturi member for deflecting air impinging thereon from the Venturi member outwardly from the grate, baffles at the upper end of the Venturi member for deflecting said air along a spiral path about the fuel discharge, and means including an air conduit surrounding the fuel feeding conduit and having a downwardly directed outlet for supplying a down draft in the furnace opposite to the Venturi member.

11. In a furnace having a combustion chamber with grates at the bottom to support a fuel bed within the chamber and to admit air into the fuel bed from the under side, a Venturi member comprising an elongated hollow shell body disposed in upright position in said chamber in intimate contact with said fuel bed and extending from the bottom of the fuel bed to above the upper surface thereof, said member being open at the bottom to receive air at the lower end and being gradually contracted from the lower end toward an intermediate portion to form an elongated upwardly gradually contracted heating compartment and a communicating superimposed compartment, means having a wall disposed in closely spaced relation to the upper end of said latter compartment and defining with the upper edge thereof a substantially peripheral passage, and baffle means disposed between said wall and latter chamber for deflecting air discharging through said peripheral passage along a spiral path of travel.

12. In a furnace having a combustion chamber and means to support a fuel bed therein and to admit air into the under portion of the fuel bed, a Venturi member comprising an elongated hollow shell body disposed in upright position in said chamber in intimate heating relation and contact with the fuel bed and extending from the lower portion of the fuel bed to above the upper surface thereof, said shell being open at the bottom to receive outside air and being gradually contracted from each end toward an intermediate portion to form an elongated upwardly gradually contracted heating compartment, a superimposed elongated gradually upwardly expanding expansion compartment, and a throat portion between and communicating with said compartments whereby air entering the lower end of the Venturi member is preheated in the heating compartment, passes through the throat portion and effects substantial cooling thereof with resultant preheating of the air and then passes freely into the expansion compartment wherein it expands freely as it travels upwardly, and air vent means of substantial cross sectional area at the upper end of the expansion compartment to permit discharge of the preheated air freely into the combustion chamber over the fuel bed.

13. In a furnace having a combustion chamber and means to support a fuel bed therein and to admit air into the under portion of the fuel bed, a Venturi member comprising an elongated hollow shell body disposed in upright position in said chamber in intimate heating relation and contact with the fuel bed and extending from the lower portion of the fuel bed to above the upper surface thereof, said shell being open at the bottom to receive outside air and being gradually contracted from each end toward an intermediate portion to form an elongated upwardly gradually contracted heating compartment, a superimposed elongated gradually upwardly expanding expansion compartment, and a throat portion between and communicating with said compartments whereby air entering the lower end of the Venturi member is preheated in the heating compartment, passes through the throat portion and effects substantial cooling thereof with resultant preheating of the air and then passes freely into the expansion compartment wherein it expands freely as it travels upwardly, and a virtually annular passage of substantial cross sectional area at the upper end of the expansion compartment operable to permit discharge of said air freely laterally from said expansion compartment into the interior of the combustion chamber.

FRED D. HOFFMAN.